(12) United States Patent
Gill et al.

(10) Patent No.: US 12,043,158 B2
(45) Date of Patent: Jul. 23, 2024

(54) UTILIZING A LIFTGATE ASSEMBLY THAT HARDWARE MOUNTS TO A VEHICLE BODY

(71) Applicant: Textron Innovations Inc., Providence, RI (US)

(72) Inventors: Robert Gill, Pearl River, LA (US); Giovanni Sequeira, Abita Springs, LA (US)

(73) Assignee: Textron Innovations Inc., Providence, RI (US)

( * ) Notice: Subject to any disclaimer, the term of this patent is extended or adjusted under 35 U.S.C. 154(b) by 824 days.

(21) Appl. No.: 16/953,616

(22) Filed: Nov. 20, 2020

(65) Prior Publication Data

US 2021/0155140 A1 May 27, 2021

Related U.S. Application Data

(60) Provisional application No. 62/939,157, filed on Nov. 22, 2019.

(51) Int. Cl.
*B60P 1/44* (2006.01)
*B60R 19/24* (2006.01)
*B62D 21/02* (2006.01)
*B62D 21/09* (2006.01)
*B62D 29/00* (2006.01)
*B62D 33/04* (2006.01)

(52) U.S. Cl.
CPC ............ *B60P 1/4414* (2013.01); *B60R 19/24* (2013.01); *B62D 21/02* (2013.01); *B62D 21/09* (2013.01); *B62D 29/00* (2013.01); *B62D 33/04* (2013.01)

(58) Field of Classification Search
CPC ......... B60P 1/4485; B60P 1/435; B60P 1/436; B60P 1/44; B60P 1/4407; B60P 1/4421; B60R 19/24; B62D 21/02; B62D 21/09; B62D 29/00; B62D 33/04
See application file for complete search history.

(56) References Cited

U.S. PATENT DOCUMENTS 1,231,380 A * 6/1917 Kissane et al. ....... B60P 1/4421
414/673
2,850,186 A * 9/1958 Zwight ................. B60P 1/4421
414/545

(Continued)

OTHER PUBLICATIONS

"Thieman Hydraulic Tailgates from 2010 Work Truck Show." YouTube, May 20, 2015, www.youtube.com/watch?v=webixhJ4peA. (Year: 2010).*

(Continued)

*Primary Examiner* — Saul Rodriguez
*Assistant Examiner* — Lucia Elba Rodriguez
(74) *Attorney, Agent, or Firm* — BainwoodHuang

(57) ABSTRACT

Techniques are directed to utilizing a liftgate assembly having a platform, a lift subsystem constructed and arranged to selectively raise and lower the platform, and a set of steel beams coupled with the lift subsystem. The set of steel beams is constructed and arranged to hardware mount to a set of aluminum beams of a vehicle. Although the sets of beams are made of different materials, the liftgate assembly and the vehicle body may be securely fastened to each other making the vehicle well suited for a variety of conditions.

18 Claims, 9 Drawing Sheets

(56) References Cited

U.S. PATENT DOCUMENTS

| | | | | |
|---|---|---|---|---|
| 3,024,926 | A | * | 3/1962 | Nolden ................. B60P 1/4421 414/545 |
| 5,176,486 | A | * | 1/1993 | Park ..................... B60P 1/4421 414/545 |
| 6,007,290 | A | * | 12/1999 | Schulz .................. B60P 1/4421 414/540 |
| 6,811,207 | B2 | | 11/2004 | Dalpizzol et al. |
| 6,988,757 | B2 | | 1/2006 | McLaren et al. |
| 9,604,677 | B2 | | 3/2017 | McKinney et al. |
| 10,029,410 | B2 | | 7/2018 | Chaaya et al. |
| 10,112,656 | B2 | | 10/2018 | McKinney et al. |
| 10,549,611 | B2 | | 2/2020 | Chaaya et al. |
| 10,940,899 | B2 | | 3/2021 | McKinney et al. |
| 11,208,156 | B2 | | 12/2021 | McKinney et al. |
| 11,267,323 | B2 | | 3/2022 | Facchinello et al. |
| 11,305,823 | B2 | | 4/2022 | McKinney et al. |
| 2008/0298942 | A1 | * | 12/2008 | Gregg .................. B60P 1/4421 414/545 |

OTHER PUBLICATIONS

"Railgates by Thieman TDR-44, 55, 66 Owners Manual/Parts List." Internet Archive: Wayback Machine, Dec. 2007, archive.org/web/. (Year: 2007).*

"Railgates by Thieman TVLR Installation Instructions." Internet Archive: Wayback Machine, Oct. 2017, archive.org/web/. (Year: 2017).*

Theiman Tailgates, Inc., "TDR44", http://thiemantailgates.com/tdr-44/, May 13, 2016, pp. 1-5.

\* cited by examiner

UTILIZING A LIFTGATE ASSEMBLY THAT HARDWARE MOUNTS TO A VEHICLE BODY

BACKGROUND

A conventional truck includes a truck chassis and a truck body. The truck chassis supports the truck body, the axles, the engine, and so on.

The conventional truck may further include a hydraulic tail lift which moves up and down for convenience in loading and unloading. For strength, the frames of both the truck body and the hydraulic tail lift are typically made of steel and welded together.

SUMMARY

Unfortunately, there are deficiencies to the above-described conventional truck in which the frames of both the truck body and the hydraulic tail lift are made of steel and welded together. Along these lines, the above-described conventional truck is poorly suited for certain applications, situations, and/or environments.

For example, the steel frame of the truck body may be susceptible to corrosion. Accordingly, the above-described conventional truck may not be well-suited for use in certain wet and/or salty conditions.

As another example, the steel frame of the truck body may significantly increase the weight of the above-described conventional truck. Accordingly, the above-described conventional truck may require a stronger suspension, a larger engine, more fuel, etc. to operate thus increasing costs.

As yet another example, welding of the truck body and the hydraulic tail lift together prevents easy removal of the hydraulic tail lift from the truck. Accordingly, replacement (or repair) of the hydraulic tail lift may be more difficult, and the presence of the hydraulic tail lift may prevent the truck from attaching and/or using other equipment making the truck less flexible.

In contrast, improved techniques are directed to utilizing a liftgate assembly that hardware mounts to a vehicle body. For example, the liftgate assembly may be robustly and reliably fastened to the vehicle body using nuts and bolts. Such hardware mounting alleviates the need to weld the liftgate assembly to the vehicle body. Accordingly, frames of the vehicle body and the liftgate assembly may be made of different materials (e.g., different metals that are difficult to weld together). Nevertheless, the liftgate assembly and the vehicle body may be securely fastened to each other to provide a vehicle which is well suited for various conditions.

In a particular use case, the vehicle is a truck having an aluminum truck body (i.e., a truck body having an aluminum frame). Additionally, the liftgate assembly has a steel frame that hardware mounts to the aluminum truck body (e.g., using nuts and bolts). Such integration of a steel liftgate assembly with an aluminum truck body makes this vehicle better suited for certain conditions compared to the earlier-described conventional truck in which the frames of both the truck body and the hydraulic tail lift are made of steel and welded together.

For example, in this use case, the aluminum truck body is more corrosion-resistant and, thus, the vehicle is better suited for certain wet and/or salty conditions such as emergency uses for saving people and/or delivering supplies in a flooded environment. Additionally, with the aluminum truck body, the weight is less than that of a steel truck body and, thus, the suspension and the engine of the vehicle do not need to be as scaled up and the vehicle consumes less fuel during operation. Furthermore, hardware mounting enables the steel liftgate assembly to be easily removed from the aluminum truck body (e.g., for liftgate replacement or repair, for attachment of different equipment to the truck, etc.).

One embodiment is directed to a liftgate assembly having a platform, a lift subsystem constructed and arranged to selectively raise and lower the platform, and a set of steel beams coupled with the lift subsystem. The set of steel beams is constructed and arranged to hardware mount to a set of aluminum beams of a vehicle.

Another embodiment is directed to a vehicle which includes a vehicle chassis, a vehicle body constructed and arranged to carry cargo, and a liftgate assembly. The vehicle body is supported by the vehicle chassis and includes a set of aluminum beams. The liftgate assembly includes a platform, a lift subsystem constructed and arranged to selectively raise and lower the platform to access the vehicle body, and a set of steel beams coupled with the lift subsystem. The set of steel beams is hardware mounted to the set of aluminum beams of the vehicle body.

Yet another embodiment is directed to a method of hardware mounting a liftgate assembly to a vehicle. The method includes:

(A) fastening a set of aluminum beams to a vehicle body of the vehicle;
(B) moving a liftgate assembly into a mounting position relative to the set of aluminum beams, the liftgate assembly including a platform, a lift subsystem constructed and arranged to selectively raise and lower the platform, and a set of steel beams coupled with the lift subsystem; and
(C) hardware mounting the set of steel beams to the set of aluminum beams fastened to the vehicle body of the vehicle.

In some arrangements, the liftgate assembly further includes a vehicle bumper which is coupled with the lift subsystem. In such arrangements, the method may further include bolting the vehicle bumper, which is coupled with the lift subsystem, to a vehicle chassis of the vehicle.

In some arrangements, the lift subsystem of the liftgate assembly includes steel-framed vertical lifts coupled to the platform. Each steel-framed vertical lift is constructed and arranged to extend and retract along a vertical axis that is perpendicular to the platform to selectively raise and lower the platform. The set of steel beams of the liftgate assembly includes steel vertical brackets coupled with the steel-framed vertical lifts of the lift subsystem.

In some arrangements, each steel vertical bracket is welded to a respective steel-framed vertical lift of the lift subsystem. Accordingly, each steel vertical bracket is richly and robustly fastened to the lift subsystem.

In some arrangements, each steel vertical bracket defines an inner channel to receive a respective aluminum beam of the vehicle body. Accordingly, each steel vertical bracket is able to richly and robustly engage with the vehicle body.

In some arrangements, each steel vertical bracket defines a column of holes which aligns with a column of holes defined by a respective aluminum beam of the vehicle body to enable that steel vertical bracket to hardware mount to the respective aluminum beam of the vehicle body. Such an arrangement enables each steel vertical bracket to fasten to vehicle body at multiple points (e.g., six points, eight points, 10 points, etc.).

In some arrangements, each steel vertical bracket includes a mid-section, a first side-section extending from a first edge of the mid-section in a direction away from the lift subsystem, and a second side-section extending from a second edge of the mid-section in the direction away from lift subsystem to provide that steel vertical bracket with a U-shaped cross-section. Such arrangements are well-suited for mounting to aluminum beams have a rectangular cross-section.

In some arrangements, the first side-section of each steel vertical bracket defines a first column of holes, the second side-section of each steel vertical bracket defines a second column of holes, and the first column of holes and a second column of holes are in alignment with each other. Such arrangements provide, for each hardware mounting point, multiple attachment points between the steel vertical bracket and the aluminum beam.

In some arrangements, the lift subsystem further includes a cross member that couples with the steel-framed vertical lifts. The liftgate assembly further includes a vehicle bumper coupled with the cross member of the lift subsystem. The vehicle bumper is constructed and arranged to hardware mount to the vehicle chassis.

In some arrangements, the cross member includes a steel horizontal connecting beam. Additionally, the vehicle bumper includes steel bumper section that is welded to the steel horizontal connecting beam. The steel bumper section defines a set of holes enabling the vehicle bumper to bolt on to the vehicle chassis.

Other embodiments are directed to apparatus, devices, assemblies, and so on. Some embodiments are directed to various methods, systems, and componentry which are involved in utilizing a liftgate that hardware mounts to a vehicle.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to utilizing a liftgate assembly that hardware mounts to a vehicle body. For example, the liftgate assembly may be robustly and reliably fastened to the vehicle body using nuts, bolts, etc. Such hardware mounting alleviates the need to weld the liftgate assembly to the vehicle body. Accordingly, frames of the vehicle body and the liftgate assembly may be made of different materials (e.g., different metals that are difficult to weld together). Nevertheless, the liftgate assembly and the vehicle body may be securely fastened to each other to provide a vehicle which is well suited for various conditions. Moreover, such hardware mounting enables removal of the liftgate assembly for added flexibility, easier replacement/repair, and so on.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
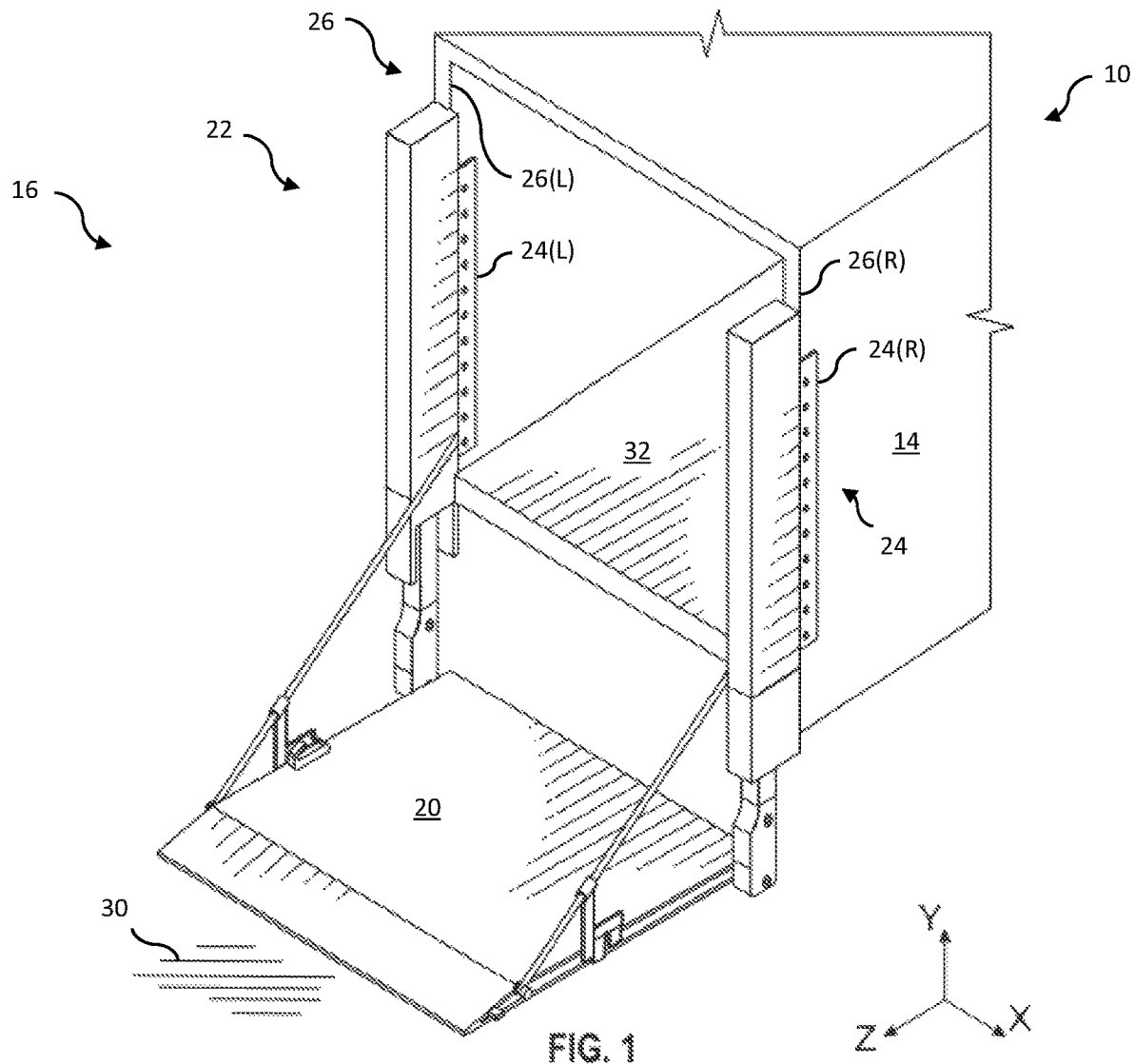
FIG. 1 is a perspective view of a vehicle which utilizes a hardware mounted liftgate assembly in accordance with certain embodiments.
Figure 2:
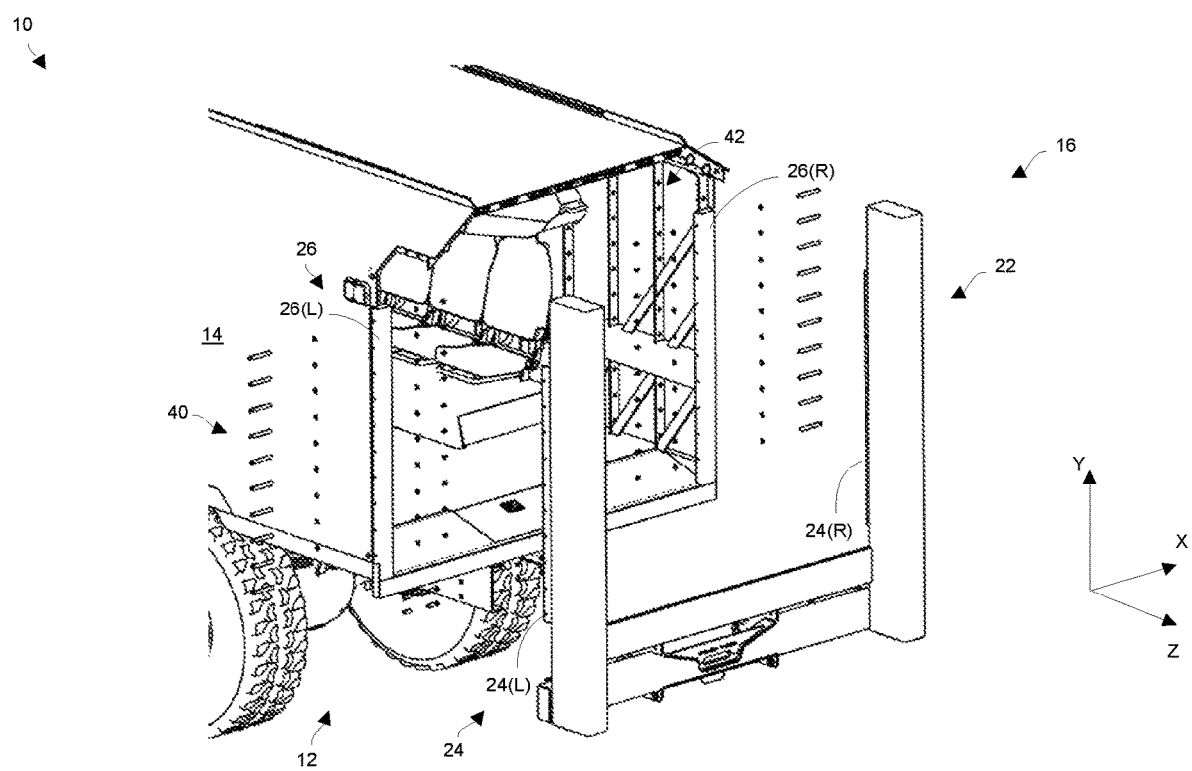
FIG. 2 is a perspective exploded view of particular details of the vehicle and the liftgate assembly in accordance with certain embodiments.

FIGS. 1 and 2 show a vehicle 10 having a hardware mounted liftgate in accordance with certain embodiments. The vehicle 10 includes a vehicle chassis 12, a vehicle body 14, and a liftgate assembly 16. FIG. 1 shows a perspective view of the liftgate assembly 16 hardware mounted to a vehicle body 14. FIG. 2 shows a partially exploded view including particular details involved in hardware mounting the liftgate assembly 16 to the vehicle body 14.

By way of example, the vehicle 10 may have a truck style form factor. For illustration purposes, the vehicle body 14 is shown as a box or trailer of a straight truck in FIG. 1, and as an enclosure of a rescue truck in FIG. 2. It should be understood that other types of trucks are suitable as well such as articulated trucks, pickup trucks with caps, tools boxes, etc., cutaways, and so on. Furthermore, other types of vehicles are suitable for use as well such as trailers, vans, buses, campers, flying vehicles, water vehicles, and so on.

The vehicle chassis 12 of the vehicle 10 is constructed and arranged to provide structural support and to operate as the load bearing framework for the vehicle body 14. Among other things, the vehicle chassis 12 includes a suspension, an engine, a power train/transmission subsystem, and a fuel subsystem.

The vehicle body 14 couples with the vehicle chassis 12 and is constructed and arranged to carry cargo. Suitable cargo includes loadable equipment, crates, boxes, people, and so on. In some arrangements, the vehicle body 14 includes structural framing, a set of walls (i.e., one or more walls) and a roof to provide shelter/security/etc., railings, windows, attachment points for objects, combinations thereof, and so on.

The liftgate assembly 16 couples with the vehicle chassis 12 and optionally with the vehicle body 14 and is constructed and arranged to facilitate cargo loading and unloading. The liftgate assembly 16 includes a platform 20, a lift subsystem 22 and a set of liftgate beams 24(L), 24(R) (collectively, liftgate beams 24) which correspond to a set of vehicle body beams 26(L), 26(R) (collectively, vehicle body beams 26) of the vehicle body 14. FIG. 1 shows the platform 20 in a deployed position, i.e., where the platform 20 extends in the X-Z plane. It should be understood that the platform 20 may be pivoted up into a retracted position, i.e., where the platform 20 resides in the X-Y plane. FIG. 2 omits the platform 20 for simplicity.

When the platform 20 is in the deployed position, the platform 20 provides a carrying surface upon which cargo may sit. The lift subsystem 22 is then able to selectively raise and lower the platform 20 along the Y-axis (e.g. under direction of a human operator) to provide easier access between the ground 30 and a floor 32 of the vehicle body 14 (also see FIG. 1).

As will be explained in further detail shortly, the liftgate beams 24 may be welded to the lift subsystem 22 of the liftgate assembly 16. Similarly, the vehicle body beams 26 may be welded to a frame 42 of the vehicle body 14. The liftgate beams 24 and the vehicle body beams 26 then fasten together using hardware 40. Accordingly, it should be understood that the vehicle body 14 and the liftgate assembly 16 may be formed predominantly of different materials that provide certain weight and strength characteristics even if the different materials (e.g., different metals) are difficult or impractical to weld together.

In accordance with certain embodiments, the liftgate assembly 16 may be primarily steel with the expectation that the liftgate assembly will be welded to a steel truck body (i.e., a truck body having a steel frame). However, the vehicle body 14 may include a frame 42 (FIG. 2) made of material other than steel such as aluminum. Nevertheless, in accordance with certain embodiments, portions of the frames are hardware mounted together to securely fasten the liftgate assembly 16 and the vehicle body 14 together.

In an example use case, suppose that the vehicle body 14 uses an aluminum frame rather than a steel frame. Further suppose that the liftgate assembly 16 uses steel framing for strength, and that hardware is used to fasten the steel frame of the liftgate assembly 16 to the aluminum frame of the vehicle body 14. In this situation, the vehicle body 14 is thus corrosion-resistant and therefore better suited for certain conditions such as rescue operations in flooded areas. Additionally, the vehicle body 14 is lighter than a steel framed vehicle body thus reducing demands on the vehicle chassis 12 (e.g., suspension and engine requirements) and requires less fuel during operation. Furthermore, the use of hardware to attach the liftgate assembly 16 to the vehicle body 14 enables easier removal of the liftgate assembly 16 thus providing flexibility and easier serviceability. Further details will now be provided with reference to FIGS. 3 through 5.

Figure 3:
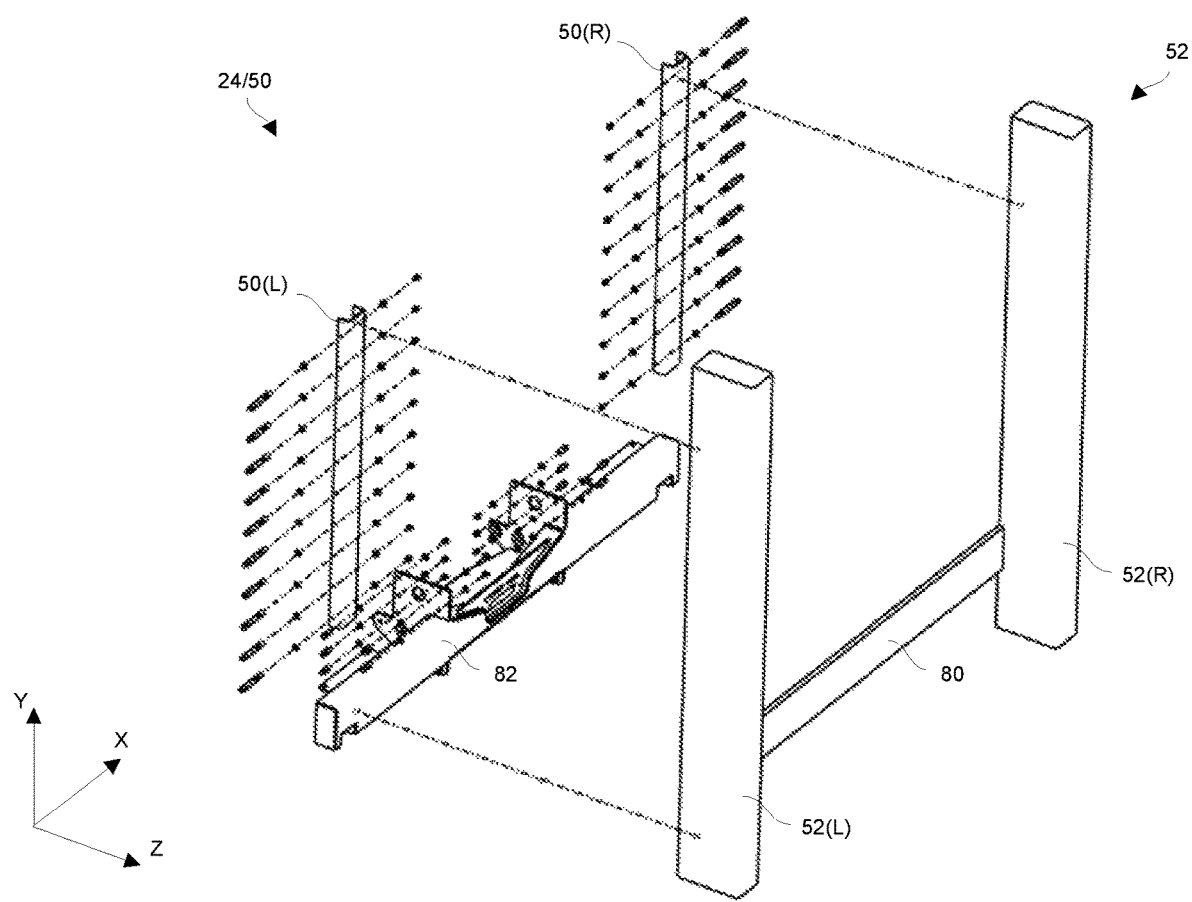
FIG. 3 is a perspective exploded view of particular details of the liftgate assembly in accordance with certain embodiments.
Figure 4:
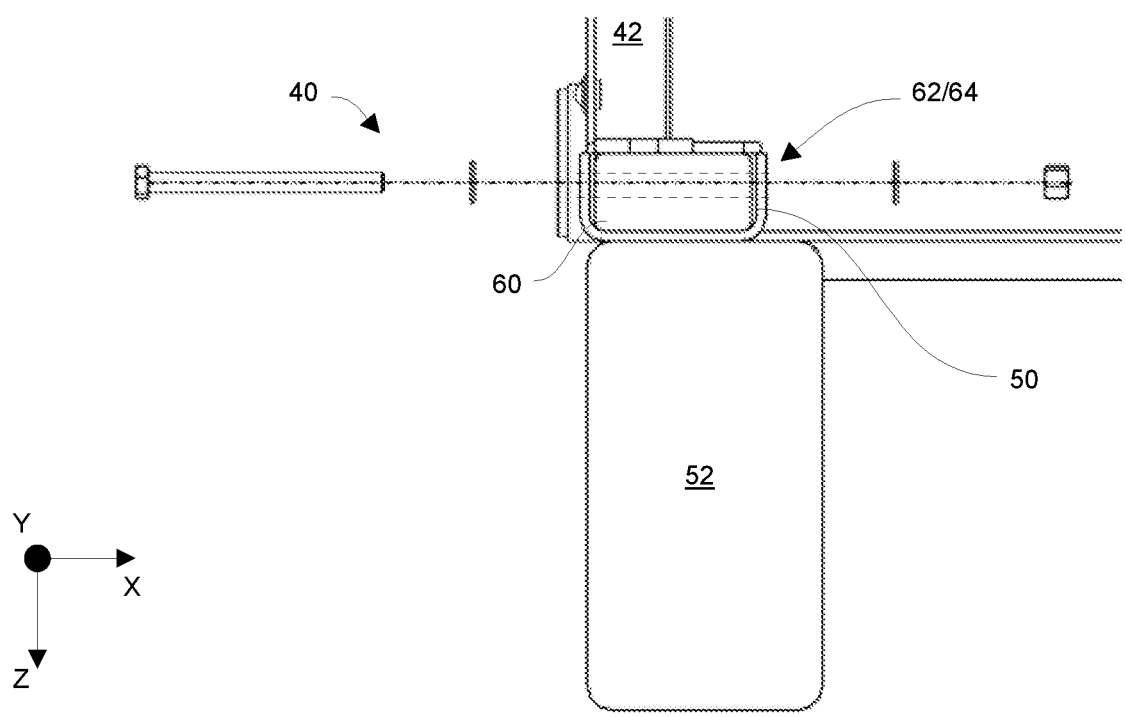
FIG. 4 is an exploded perspective view of particular details in accordance with certain embodiments.
Figure 5:
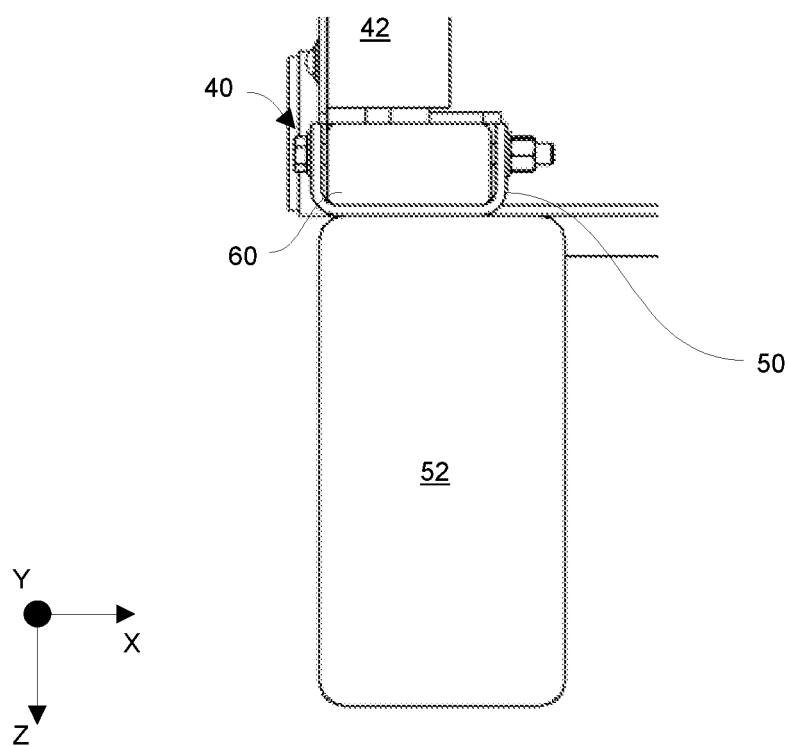
FIG. 5 is a top exploded view of particular details in accordance with certain embodiments.

FIGS. 3 and 5 show particular hardware mounting details in accordance with certain embodiments. FIG. 3 shows a partially exploded view of particular components. FIG. 4 shows a top exploded view. FIG. 5 shows a top assembled view.

As shown in FIGS. 3 through 5, the liftgate beams 24 extend vertically (i.e., along the Y-axis). The liftgate beams 24 may take the form of steel brackets 50 having U-shaped cross-sections for structural strength. Along these lines, a steel bracket 50(L) fastens to a steel-framed vertical lift 52(L) (i.e., part of the lift subsystem 22) on the left side of the liftgate assembly 16. Likewise, a steel bracket 50(R) fastens to a steel-framed vertical lift 52(R) on the right side of the liftgate assembly 16. The steel brackets 50 may be welded to the steel-framed vertical lifts 50 (e.g., via stitch welding, seam welding, etc.) since both are made of steel.

Similarly, it should be understood that the vehicle body beams 26 extend vertically and may fasten to the frame 42 of the vehicle body 14 (also see FIG. 2). Along these lines, the vehicle body beams 26 may take the form of aluminum bars 60 having rectangular cross sections. In some arrangements, portions of the frame 42 of the vehicle body 14 are aluminum, and the aluminum bars 60 are welded to those frame portions since both are made of aluminum.

FIGS. 4 and 5 show, in accordance with certain embodiments, particular hardware mounting details between a steel bracket 50 of the liftgate assembly 16 and an aluminum bar 60 of the vehicle body 14. FIG. 4 shows how a particular steel bracket 50 is hardware mounted to a particular aluminum bar 60. FIG. 5 shows the particular steel bracket 50 and the particular aluminum bar 60 once the hardware 40 is in place to secure the steel bracket 50 and the aluminum bar 60 together. It should be understood that these components have a bracket and bar geometry to enable the components to easily align and engage with each other. Other arrangements are suitable for use as well.

As seen in the exploded view of FIG. 4, the aluminum bar 60 defines a column of holes 62 along the Y-axis to accommodate the mounting hardware 40 (also see the vehicle body beams 26 in FIG. 2). Each hole 62 extends through the aluminum bar 60 along the X-axis.

Additionally, to provide the U-shape, the steel bracket 50 includes a mid-section, a first side-section extending from a first edge of the mid-section in a direction away from the lift subsystem 22 (FIGS. 1 and 2), and a second side-section extending from a second edge of the mid-section in the direction away from the lift subsystem 22.

Furthermore, each side-section of the steel beam 42 defines a column of holes 64 (also see FIG. 4). The column of holes 64 defined by each side-section align with the column of holes 62 defined by the aluminum bar 60 in order to receive the mounting hardware 40 (e.g., a bolt). In accordance with certain embodiments, the mounting hardware 54 includes threaded bolts, threaded nuts, and washers to form a secure attachment point.

FIG. 5 shows an assembled view in which the steel bracket 50 and the aluminum bar 60 are engaged with each other, i.e., the aluminum bar 60 fits within a groove defined by the steel bracket 50. Additionally, the mounting hardware 40 attaches the steel bracket 50 and the aluminum bar 60 together.

The number of hardware attachment points, the number of columns of holes, distance between holes, and/or the size of the hardware 54 may be adjusted based on the required strength. Such parameters may be based on the amount of weight of the liftgate assembly 16 and the amount of weight expected to be carried by the platform 20 (e.g., 400 pounds, 600 pounds, 800 pounds, etc.) among other things. Further details will now be provided with reference to FIGS. 3 and 6.

With reference back to FIG. 3, the liftgate assembly 16 further includes a cross member 80 and a vehicle bumper 82 in accordance with certain embodiments. The cross member 80 couples with the steel-framed vertical lifts 52 of the lift subsystem 22 and provides stability, strength, spacing, etc. The vehicle bumper 82 provides protection to the vehicle 10 in the event of a collision and attaches the liftgate assembly 16 to the vehicle chassis 12 (also see FIGS. 1 and 2). In some arrangements, the cross member 80 and the vehicle bumper 82 are both made of steel and welded together. In other arrangements, the cross member 80 and the vehicle bumper 82 are hardware mounted together.

Figure 6:
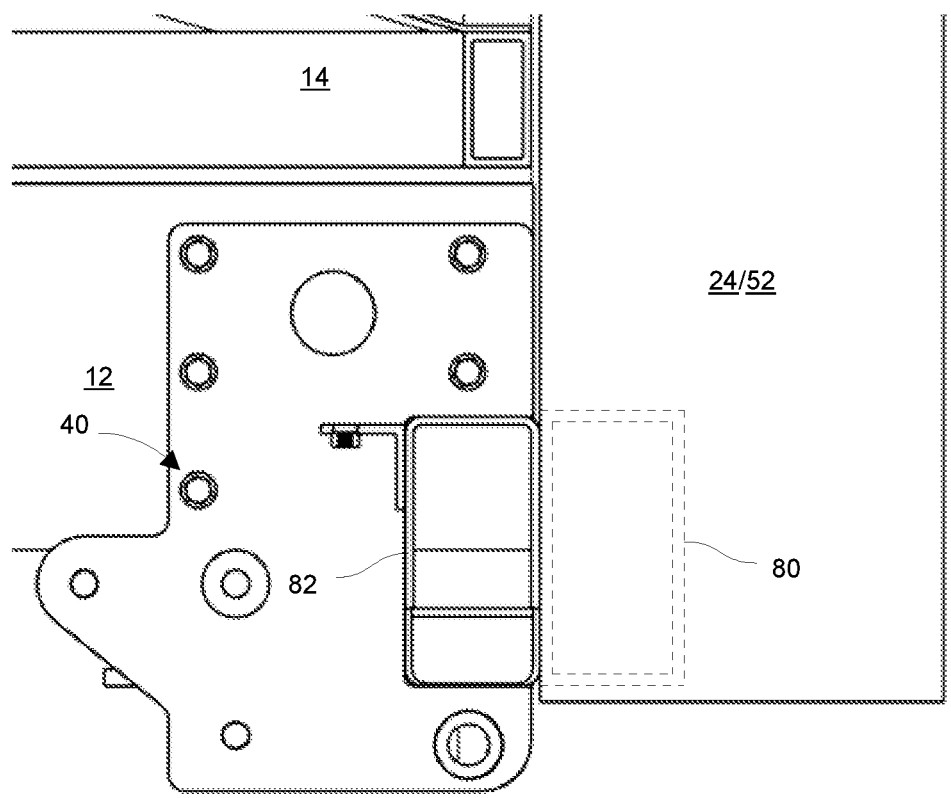
FIG. 6 is a side view of particular details in accordance with certain embodiments.

FIG. 6 shows the vehicle bumper 82 welded to the cross member 80 (shown in phantom), and the vehicle bumper 82 further hardware mounted to the vehicle chassis 12. Suitable hardware 40 for mounting the vehicle bumper 82 to the vehicle chassis 12 includes bolts, nuts, washers, etc. in a manner similar to that described above for the fastening the beams 24, 26 together (FIG. 2).

Such hardware mounting of the vehicle bumper 82 to the vehicle chassis 12 using hardware 40 enables subsequent detachment. This feature provides flexibility to the vehicle 10 such as the ability to easily replace or repair the liftgate assembly 16, the ability to use the vehicle 10 without any attachment or with different equipment attached, and so on.

Figure 7:
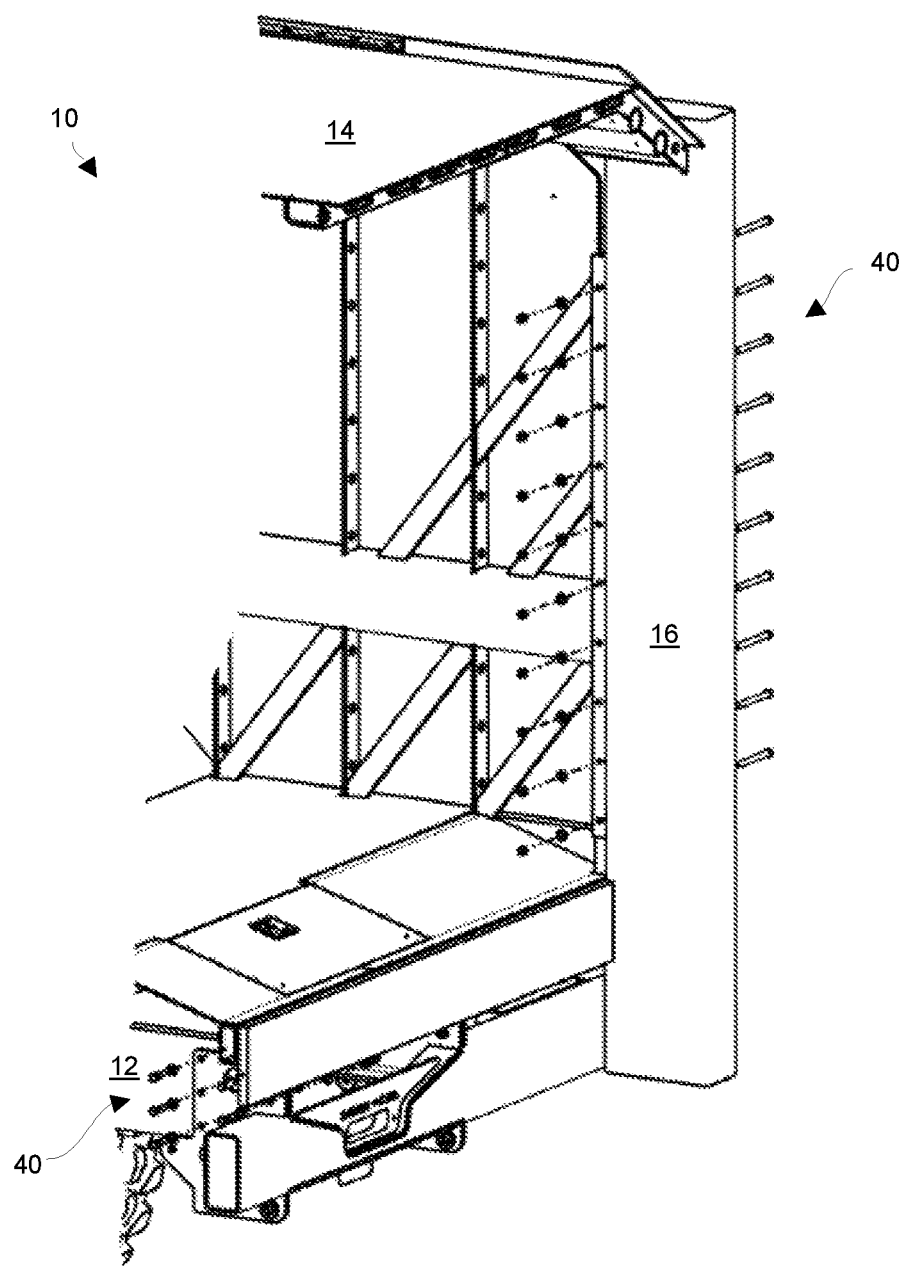
FIG. 7 is a cutaway/exploded view of particular details in accordance with certain embodiments.
Figure 8:
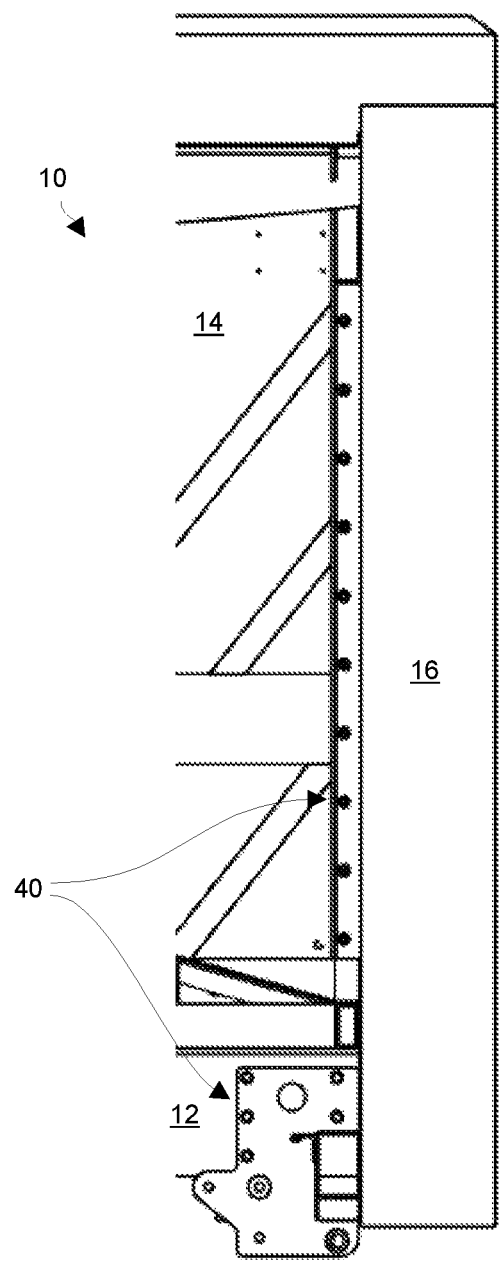
FIG. 8 is another side view of particular details in accordance with certain embodiments.

FIGS. 7 and 8 show further hardware mounting details. FIG. 7 shows a cutaway/exploded view to illustrate alignment of holes between portions of the liftgate assembly 16, the vehicle chassis 12 and the vehicle body 14. FIG. 8 shows a side view of particular hardware mounting points when the liftgate assembly 16 is secured to the vehicle chassis 12 as well as the vehicle body 14. Further details will now be provided with reference to FIG. 9.

Figure 9:
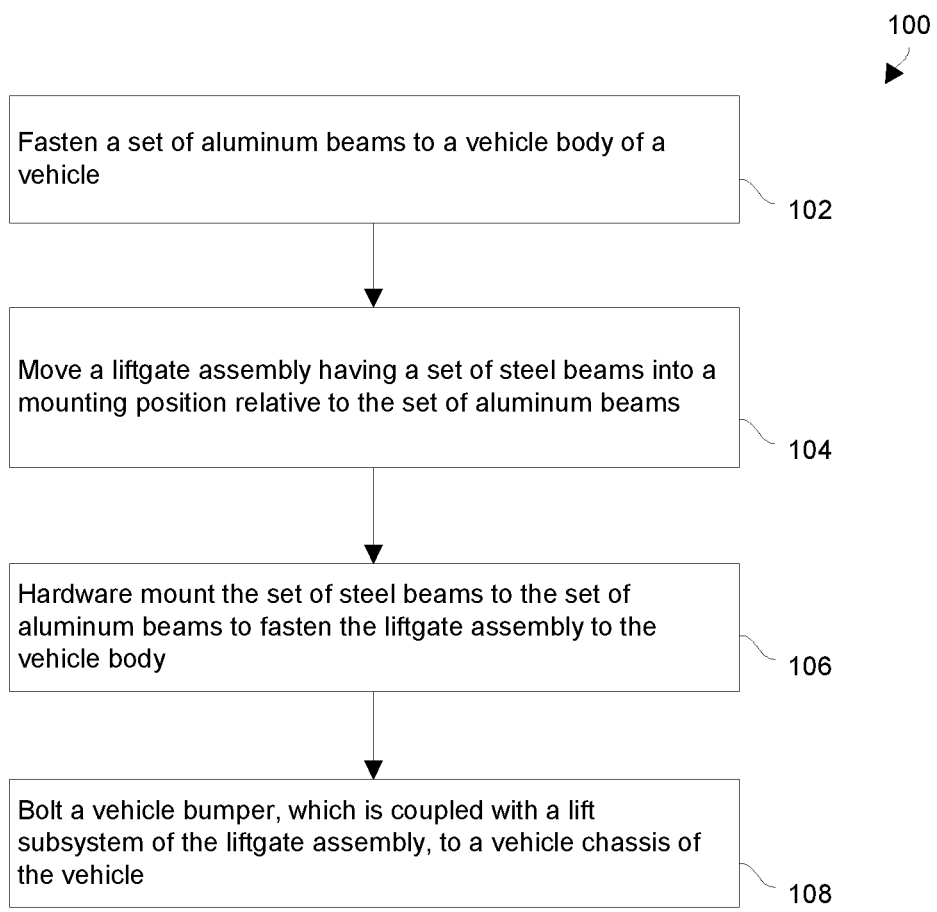
FIG. 9 is a flowchart of a procedure which is performed in accordance with certain embodiments.

FIG. 9 is a flowchart of a procedure 100 for hardware mounting a liftgate assembly to a vehicle in accordance with certain embodiments.

At 102, a set of aluminum beams is fastened to a vehicle body of the vehicle. For example, the set of aluminum beams includes aluminum bars which are welded to an aluminum frame of the vehicle body.

At 104, a liftgate assembly having a set of steel beams is moved into a mounting position relative to the set of aluminum beams. For example, the set of steel beams may include steel brackets which are welded to respective vertical lifts of the liftgate assembly.

At 106, the set of steel beams is hardware mounted to the set of aluminum beams fastened the liftgate assembly to the vehicle body of the vehicle. Such fastening may involve aligning columns of holes in the beams, inserting bolts through the holes, fastening the bolts using washers and nuts, and so on.

At 108, in accordance with certain embodiments, a vehicle bumper, which is coupled with a lift subsystem of the liftgate assembly, is bolted to a vehicle chassis of the vehicle. Similarly such fastening may involve aligning holes, inserting bolts through the holes, fastening the bolts using washers and nuts, and so on.

Accordingly, the liftgate assembly is now richly and robustly secured in place. Moreover, the liftgate assembly may be easily removed for flexibility.

As described above, improved techniques are directed to utilizing a liftgate assembly 16 that hardware mounts to a vehicle body 12. For example, the liftgate assembly 16 may be securely fastened to the vehicle body 12 using nuts and bolts. Such hardware mounting alleviates the need to weld the liftgate assembly 16 to the vehicle body 12. Accordingly, frames of the vehicle body 12 and the liftgate assembly 16 may be made of different materials (e.g., different metals that are difficult to weld together). Nevertheless, the liftgate assembly 16 and the vehicle body 12 may be securely fastened to each other to provide a vehicle 10 which is well suited for various conditions.

In accordance with certain embodiments, the vehicle may take the form of a highwater rescue vehicle capable of lifting people and objects from the ground into the body and to transport them to safety. This capability is accomplished by incorporating a liftgate system onto the body. Certain embodiments disclosed herein are suitable for use even if the liftgate system is designed to be welded to a steel body. Since the vehicle is intended for a wet environment, it may be helpful to maximize the use of corrosion resistant materials. Therefore, the body may be made from aluminum.

Since welding a steel liftgate to an aluminum structure is difficult and perhaps unreliable, using certain techniques disclosed herein, the liftgate use a bolt on design. To this end, a set of steel structures are welded onto the liftgate that then bolt up to the chassis (e.g., a lower support) and to the body (e.g., an upper support) of the vehicle.

While various embodiments of the present disclosure have been particularly shown and described, it will be understood by those skilled in the art that various changes in form and details may be made therein without departing from the spirit and scope of the present disclosure as defined by the appended claims.

For example, the lift subsystem of the liftgate and the vehicle were described above as having beams of steel and aluminum, respectively, by way of example only. It should be understood that other beam materials are suitable for use as well such as plastics, wood, other metals, and so on. Moreover other beam geometries and hardware mounting techniques are suitable for use as well.

Although the sets of beams may be made of different materials, the liftgate assembly and the vehicle body may be securely fastened to each other making the vehicle well suited for a variety of conditions. Hardware mounting was disclosed herein as being suitable for such fastening. Nevertheless, other mounting techniques may be used as well or in combination with hardware mounting such as locking tabs, hooks that extend into slots, and so on.

Furthermore, in accordance with certain arrangements, the sets of beams are made of the same material. For example, both sets of beams may be made of steel. Such arrangements nevertheless enable the liftgate assembly to be removed for maintenance, replacement, repair, and so on. Such modifications and enhancements are intended to belong to various embodiments of the disclosure.

What is claimed is:

1. A vehicle, comprising
    a vehicle chassis;
    a vehicle body constructed and arranged to carry cargo, the vehicle body being supported by the vehicle chassis and including a set of aluminum beams; and
    a liftgate assembly which includes:
        a platform,
        a lift subsystem constructed and arranged to selectively raise and lower the platform to access the vehicle body, and
        a set of steel beams coupled with the lift subsystem, the set of steel beams being hardware mounted to the set of aluminum beams of the vehicle body;
    wherein the lift subsystem of the liftgate assembly includes steel-framed vertical lifts coupled to the platform, each steel-framed vertical lift being constructed and arranged to extend and retract along a vertical axis that is perpendicular to the platform to selectively raise and lower the platform;
    wherein the set of steel beams of the liftgate assembly includes steel vertical brackets coupled with the steel-framed vertical lifts of the lift subsystem; and
    wherein each steel vertical bracket defines an inner channel to receive a respective aluminum beam of the vehicle body;
    wherein each steel vertical bracket has a U-shaped cross-section including a first side-section and a second side-section, the first side-section defining a first set of through holes, the second side-section defining a second set of through holes, the first set of through holes being concentric with both the second set of through holes and a third set of through holes defined by the respective aluminum beam of the vehicle body; and
    wherein the liftgate assembly includes removable mounting hardware that couples each steel vertical bracket with the respective aluminum beam by extending through the first set of through holes, the second set of through holes, and the third set of through holes.

2. A vehicle as in claim 1 wherein each steel vertical bracket is welded to a respective steel-framed vertical lift of the lift subsystem.

3. A vehicle as in claim 1 wherein each steel vertical bracket defines a column of holes which aligns with a column of holes defined by a respective aluminum beam of the vehicle body to enable that steel vertical bracket to hardware mount to the respective aluminum beam of the vehicle body.

4. A vehicle as in claim 1 wherein each steel vertical bracket includes a mid-section, the first side-section extending from a first edge of the mid-section in a direction away from the lift subsystem, and the second side-section extending from a second edge of the mid-section in the direction away from lift subsystem to provide that steel vertical bracket with the U-shaped cross-section.

5. A vehicle as in claim 4 wherein the first side-section of each steel vertical bracket defines a first column of holes;
wherein the second side-section of each steel vertical bracket defines a second column of holes; and
wherein the first column of holes and a second column of holes are in alignment with each other.

6. A vehicle as in claim 1 wherein the lift subsystem further includes a cross member that couples with the steel-framed vertical lifts; and
wherein the liftgate assembly further comprises:
a vehicle bumper coupled with the cross member of the lift subsystem, the vehicle bumper being constructed and arranged to hardware mount to the vehicle chassis.

7. A vehicle as in claim 6 wherein the cross member includes a steel horizontal connecting beam; and
wherein the vehicle bumper includes steel bumper section that is welded to the steel horizontal connecting beam, the steel bumper section defining a set of holes enabling the vehicle bumper to bolt on to the vehicle chassis.

8. A vehicle as in claim 1 wherein the first side-section of each steel vertical bracket has a first inner face defining a first side of the inner channel, and the second side-section of each steel vertical bracket has a second inner face defining a second side of the inner channel;
wherein the respective aluminum beam of each steel vertical bracket has a first outer face and a second outer face parallel to the first outer face; and
wherein the first inner face of each steel vertical bracket aligns with the first outer face of the respective aluminum beam, and the second inner face of each steel vertical bracket aligns with the second outer face of the respective aluminum beam.

9. The vehicle as in claim 1 wherein the first side-section of each steel vertical bracket and the second side-section of each steel vertical bracket fit around the respective aluminum beam; and
wherein the removable mounting hardware includes nuts and bolts, heads of the nuts contacting a first face of the first side-section and not the respective aluminum beam, heads of the bolts contacting a second face of the second side-section and not the respective aluminum beam to provide structural strength and stability.

10. A liftgate assembly, comprising:
a platform;
a lift subsystem constructed and arranged to selectively raise and lower the platform; and
a set of steel beams coupled with the lift subsystem, the set of steel beams being constructed and arranged to hardware mount to a set of aluminum beams of a vehicle;
wherein the lift subsystem of the liftgate assembly includes steel-framed vertical lifts coupled to the platform, each steel-framed vertical lift being constructed and arranged to extend and retract along a vertical axis that is perpendicular to the platform to selectively raise and lower the platform;
wherein the set of steel beams of the liftgate assembly includes steel vertical brackets coupled with the steel-framed vertical lifts of the lift subsystem; and
wherein each steel vertical bracket defines an inner channel to receive a respective aluminum beam of the vehicle body;
wherein each steel vertical bracket has a U-shaped cross-section including a first side-section and a second side-section, the first side-section defining a first set of through holes, the second side-section defining a second set of through holes, the first set of through holes being constructed and arranged to be concentric with both the second set of through holes and a third set of through holes defined by the respective aluminum beam of the vehicle body; and
wherein the liftgate assembly includes removable mounting hardware constructed and arranged to couple each steel vertical bracket with the respective aluminum beam by extending through the first set of through holes, the second set of through holes, and the third set of through holes.

11. A liftgate assembly as in claim 10 wherein each steel vertical bracket is welded to a respective steel-framed vertical lift of the lift subsystem; and
wherein each steel vertical bracket defines a column of holes which aligns with a column of holes defined by a respective aluminum beam of the vehicle to enable that steel vertical bracket to hardware mount to the respective aluminum beam of the vehicle.

12. A liftgate assembly as in claim 10 wherein each steel vertical bracket includes a mid-section, the first side-section extending from a first edge of the mid-section in a direction away from the lift subsystem, and the second side-section extending from a second edge of the mid-section in the direction away from the lift subsystem to provide that steel vertical bracket with the U-shaped cross-section.

13. A liftgate assembly as in claim 12 wherein the first side-section of each steel vertical bracket defines a first column of holes;
wherein the second side-section of each steel vertical bracket defines a second column of holes; and
wherein the first column of holes and the second column of holes are in alignment with each other.

14. A liftgate assembly as in claim 13 wherein the first column of holes and the second column of holes are further in alignment with a column of holes defined by a respective aluminum beam of the vehicle body to enable the liftgate assembly to bolt mount to the vehicle.

15. A liftgate assembly as in claim 10 wherein the lift subsystem further includes a cross member that couples with the steel-framed vertical lifts; and
wherein the liftgate assembly further comprises:
a vehicle bumper coupled with the cross member of the lift subsystem, the vehicle bumper being constructed and arranged to hardware mount to the vehicle.

16. A liftgate assembly as in claim 15 wherein the cross member includes a steel horizontal connecting beam; and
wherein the vehicle bumper includes steel bumper section that is welded to the steel horizontal connecting beam, the steel bumper section defining a set of holes enabling the vehicle bumper to bolt on to a frame of the vehicle.

17. A method of hardware mounting a liftgate assembly to a vehicle, the method comprising:
fastening a set of aluminum beams to a vehicle body of the vehicle;
moving a liftgate assembly into a mounting position relative to the set of aluminum beams, the liftgate assembly including a platform, a lift subsystem constructed and arranged to selectively raise and lower the platform, and a set of steel beams coupled with the lift subsystem; and
hardware mounting the set of steel beams to the set of aluminum beams fastened to the vehicle body of the vehicle;
wherein the lift subsystem of the liftgate assembly includes steel-framed vertical lifts coupled to the platform, each steel-framed vertical lift being constructed and arranged to extend and retract along a vertical axis that is perpendicular to the platform to selectively raise and lower the platform;
wherein the set of steel beams of the liftgate assembly includes steel vertical brackets coupled with the steel-framed vertical lifts of the lift subsystem;
wherein each steel vertical bracket defines an inner channel to receive a respective aluminum beam of the vehicle body;
wherein each steel vertical bracket has a U-shaped cross-section including a first side-section and a second side-section, the first side-section defining a first set of through holes, the second side-section defining a second set of through holes;
wherein moving the liftgate assembly into the mounting position includes positioning the first set of through holes and the second set of through holes to be concentric with a third set of through holes defined by the respective aluminum beam of the vehicle body; and
wherein hardware mounting the set of steel beams includes extending removable mounting hardware through the first set of through holes, the second set of through holes, and the third set of through holes to couple each steel vertical bracket with the respective aluminum beam.

18. A method as in claim 17 wherein the liftgate assembly further includes a vehicle bumper which is coupled with the lift subsystem; and
wherein the method further comprises:
bolting the vehicle bumper, which is coupled with the lift subsystem, to a vehicle chassis of the vehicle.

\* \* \* \* \*